(12) United States Patent  
Shevchenko

(10) Patent No.: US 7,840,997 B2  
(45) Date of Patent: Nov. 23, 2010

(54) METHOD AND DEVICE FOR COMPUTER MEMORY PROTECTION AGAINST UNAUTHORIZED ACCESS

(76) Inventor: Oleksiy Yu. Shevchenko, ul. Novogospitalnaya, 27a-19, Kiev, 01133 (UA)

( * ) Notice: Subject to any disclaimer, the term of this patent is extended or adjusted under 35 U.S.C. 154(b) by 1229 days.

(21) Appl. No.: 10/509,423

(22) PCT Filed: May 30, 2002

(86) PCT No.: PCT/UA02/00022

§ 371 (c)(1),  
(2), (4) Date: May 16, 2005

(87) PCT Pub. No.: WO03/084176

PCT Pub. Date: Oct. 9, 2003

(65) Prior Publication Data

US 2005/0251693 A1    Nov. 10, 2005

(30) Foreign Application Priority Data

Mar. 28, 2002    (UA)    ............................... 2002032465

(51) Int. Cl.  
*G06F 21/02* (2006.01)  
*G06F 12/00* (2006.01)  
(52) U.S. Cl. .......................................... 726/16; 726/34  
(58) Field of Classification Search ........................ None  
See application file for complete search history.

(56) References Cited

U.S. PATENT DOCUMENTS

| 5,623,600 | A | | 4/1997 | Shuang et al. |
| 5,896,499 | A | * | 4/1999 | McKelvey ................... 726/11 |
| 5,935,244 | A | * | 8/1999 | Swamy et al. .................. 726/9 |
| 5,974,549 | A | | 10/1999 | Golan |
| 5,987,611 | A | | 11/1999 | Freund |
| 6,061,742 | A | * | 5/2000 | Stewart et al. ............... 709/250 |
| 6,125,447 | A | | 9/2000 | Gong |
| 6,167,522 | A | | 12/2000 | Lee et al. |
| 6,275,938 | B1 | | 8/2001 | Bond et al. |

(Continued)

FOREIGN PATENT DOCUMENTS

EP    0 959 570 A    11/1999

OTHER PUBLICATIONS

Cheswick et al, H1944 H, "Firewall Security Method and Apparatus", Feb. 6, 2001, p. 1-12.*

*Primary Examiner*—Christopher A Revak  
(74) *Attorney, Agent, or Firm*—McDermott Will & Emery LLP

(57) ABSTRACT

A METHOD FOR PROTECTION COMPUTER MEMORY AGAINST UNAUTHORIZED ACCESS includes partitioning data received via communication links and instructions for controlling the processing of data incoming from a protected computer by means of an external controller. To substantially eliminate any breach in the firewall all the messages received in a communication session are logged into an external storage locked at the side of the protected computer, the external storage input is locked, and independently of CPU, long-term storage and operating storage of the protected computer, messages are sorted into textual and/or iconic files, program files and files of undefined type, and the demand in the files received and admissibility of their usage in the protected computer is individually determined.

A DEVICE FOR CARRYING OUT THE METHOD comprises an external storage, a controllable input switch and a controllable output switch connected to the external controller.

20 Claims, 1 Drawing Sheet

U.S. PATENT DOCUMENTS

| | | |
|---|---|---|
| 6,295,639 B1 | 9/2001 | Van Der Meer |
| 6,345,099 B1 * | 2/2002 | Alvarez .................. 380/203 |
| 6,489,954 B1 | 12/2002 | Powlette |
| 6,535,729 B1 | 3/2003 | Shah |
| 6,757,685 B2 | 6/2004 | Raffacle et al. |
| 7,007,304 B1 * | 2/2006 | Girard et al. .................. 726/30 |
| 7,073,070 B2 * | 7/2006 | Girard ........................ 713/190 |
| 7,146,008 B1 * | 12/2006 | Hannah et al. .............. 380/236 |
| 7,207,061 B2 * | 4/2007 | Martin ........................ 726/11 |
| 2002/0018077 A1 | 2/2002 | Powlette |
| 2010/0092025 A1 * | 4/2010 | Folea et al. ................. 382/100 |

\* cited by examiner

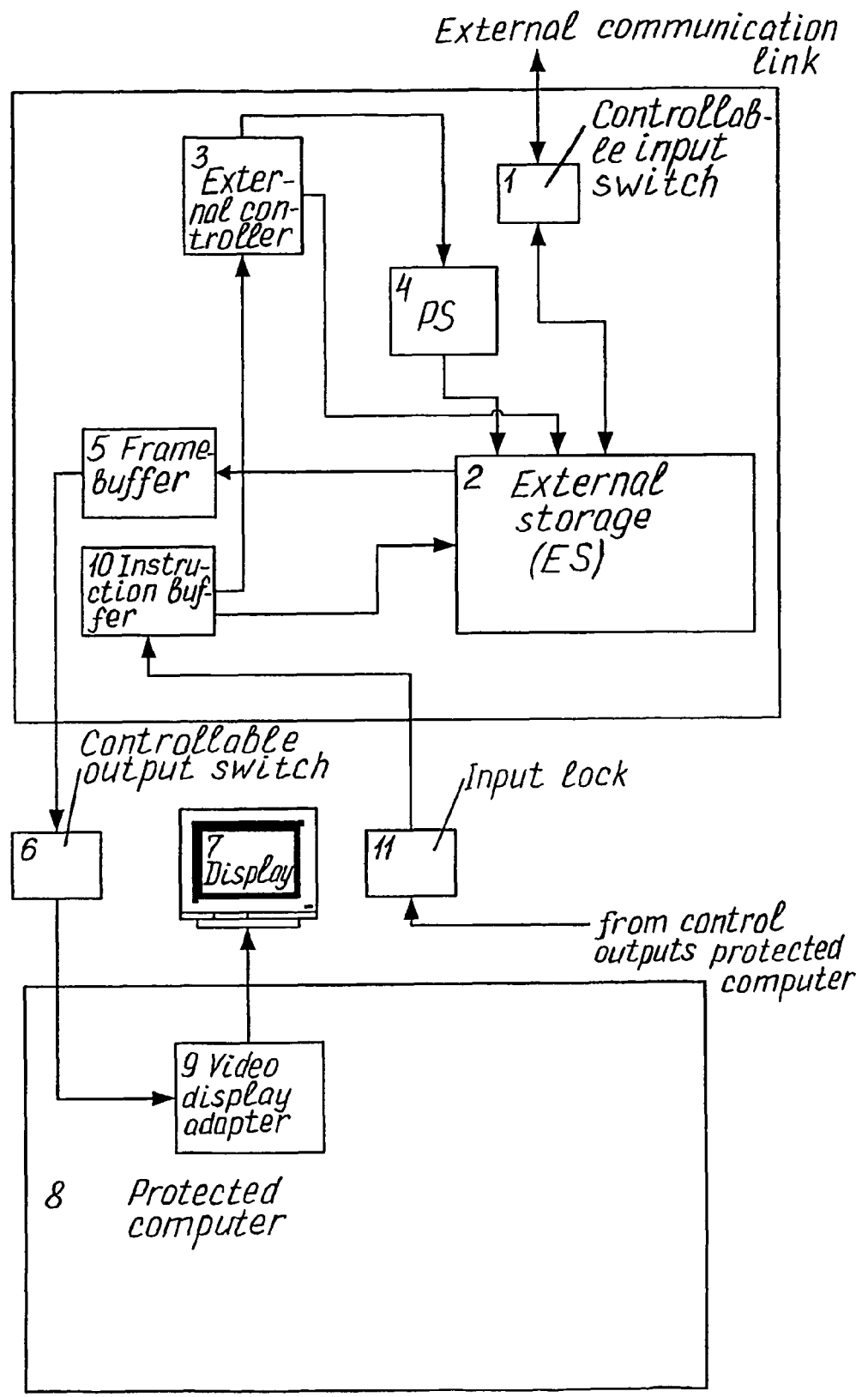

METHOD AND DEVICE FOR COMPUTER MEMORY PROTECTION AGAINST UNAUTHORIZED ACCESS

FIELD OF INVENTION

The invention relates to methods for protection of computer memory against unauthorized access of outside users via arbitrary communication links and to the structure of devices for practicing such methods.

It should be taken into consideration that for the purpose of this description, the following terms as employed herein and in the appended claims refer to the following concepts:

"computer" refers primarily to a personal computer (PC hereafter) that operates individually or in a local net in the mode of free data exchange with other computers through an arbitrary communication link, and particularly through the Internet;

"computer memory" refers to:
hardware, such as an on-board long-term storage (LTS hereafter) and operating storage (OS hereafter), and
data sets, such as data bases (DB hereafter) and/or knowledge bases (KB hereafter) and/or installed software (SW hereafter) including data and/or knowledge base management systems stored on said hardware;

"permanent storage (PS hereafter)" refers to at least one such device for storing software connected with external controller which is designed for processing (particularly for sorting and testing) any entries from CPU, LTS and OS of the protected computer;

"protection" refers to avoidance of unauthorized access to the memory of any computer through arbitrary open communication links and accordingly avoidance of stealing and/or damage and/or change of SW and/or DB and/or KB;

"outside user" refers to any hacker, but mainly to a cracker who aims at active impact on the operation of somebody else's computer on his own will or by request.

BACKGROUND ART

It is commonly known that gigantic quantity of information is contained in the memory of modern computers; damage, loss or disclosure of such information may lead to serious material and/or political losses. Therefore, damage of SW and especially DB or KB by computer viruses and theft or changing of data have become long ago a serious threat even to home PC owners, nothing to say about corporations, individual state organizations and states on the whole.

Actually, computer owners often suffer from viruses received accidentally either from the Internet or along with letters from E-mail or during data exchange with other users using floppy disks or other self-contained means for data storage and communication. And though the development and distribution of new viruses are usually not goal-seeking hooliganism, it is as more dangerous as less prepared are certain users to virus attacks.

Still more dangerous is intended, goal-seeking cracking of databases of corporations, banks and public institutions by crackers. Not infrequently, they act by the orders from competitors or terrorists, using more and more sophisticated cracking software of the 'worm' and/or 'Trojan horse' types. Especially dangerous in the modern world is cracking of military dataware systems and troops control systems, which can open up unexpected possibilities for committing acts of terrorism.

It is clear from the above, that the means for preclusion of said threat must be effective as much as possible regardless of the source and nature of the threat, reliable, simple, user friendly and sold at a reasonable price.

Unfortunately, only some of those requirements can be successfully fulfilled at present.

Well known are, e.g. means for reducing probability of unauthorized access to computer memory, such as alphabetic, numeric and alphanumeric passwords. They are cheap, simple and easy-to-use.

However, in the course of development of the art of hacking, it has turned out that such 'verbal' passwords are noticeable obstacles only for novice users. Actually, nowadays even iconic passwords of the sort of fingerprints or iris of the legal PC user, which are substantially more expensive in use, do not protect the computer against cracking. Moreover, no passwords can protect SW, DB and KB against infection with viruses and against damage.

It is clear that creation and distribution of antiviruses, and, lately, antiviral software complexes with heuristic components reduce losses of damage of SW, DB and KB. However, this way is effective only in case the attack is done by identified viruses against which antiviruses have been created.

Another commonly known method of reducing the probability of unauthorized access to the computer memory is based on the utilization of cryptography (see chapter Conspiracy—Fiction and Reality in the book "Internet Security Secrets" by John R. Vacca, IDG Books Worldwide, Inc./« Конспирация—вымысел и реальность». Д. Вакка. Секреты безопасности вInternet.—Киев: ДИАЛЕКТИКА, 1997).

Unfortunately, this method is useful for safe data exchange only between users well acquainted to each other, whose circle is very narrow, said method involving codes that comprise more than 128 bits. This makes the computer protection extremely expensive and constricts the potentialities of information interchange via arbitrary communication links.

Therefore, workers in the art more and more often tend to erect obstacles between individual computers and communication links open to general use, such obstacles being called 'firewalls'.

Any modern firewall comprises a firmware complex that provides for filtering entries (e.g. net traffic), extracting (in accordance with pre-selected criteria) suspicious entries and either precluding their access in the protection zone or temporarily isolating them, e.g. in a 'sandbox' for the follow-up inspection out of contact with the native DB or KB.

Thus, U.S. Pat. No. 6,275,938 discloses a method for verifying suspicious programs engineered for running directly on computer platform having memory modules and interface. The method comprises:

extracting a predetermined limited storage area ('sandbox') in the computer LTS for logging and storage of suspicious programs, loading such programs into said sandbox, entering a check code in each suspicious program for blocking external links of said sandbox, replacing concatenations in the code for the interface module with concatenations with a conversion module for suppression and blocking the operation of certain parts of the interface module, and check-running the suspicious program.

Such verification includes the usage of the native hardware and software of the computer to be protected. Therefore, even in case the users of the protected computers take an active control over the verification, professional crackers can breach the firewall. Moreover, not only suspicious programs can be the carriers of worms and Trojan horses but also textual and/ or iconic messages taken from the Internet, which are inoffensive in appearance, may happen to be such.

More effective are firewalls that:

are automatically inserted on detecting such patterns of activity in messages received via communication links that indicate an attempted breach of the safety system (U.S. Pat. No. 6,304,975); or are equipped with additional input-output interfaces utilizing codes of the type 'friend-foe' well-known to those skilled in the art.

However, automatically controlled software firewalls are not effective when crackers use such cracking software that have not been considered in the protection program, and utilization of said codes is actually possible only in relatively closed net of the Ethernet type, were each user receives the code 'friend' prior to coming into contact.

Therefore, creation of firewalls for such PC and computer systems that are to operate in the mode of free data exchange with other computers via arbitrary communication links and particularly via Internet remains an actual problem.

To overcome that problem, it is advisable to use additional hardware having native software. According to the available data, the most alike with the method and device of the invention are method and device for protection of computer memory against unauthorized access of outside users via Internet disclosed in U.S. Pat. No. 6,061,742.

Known method is based on partitioning the data received from an external net via public communication links and instructions for controlling the processing of data incoming from the protected computer.

To practice the method, an intermediate net adapter is suggested that comprises:

a first interface for data exchange between the external net and this adapter, a second interface for data exchange between this adapter and a native net interface of a protected computer, and an external controller (processor) connected with said net adapter and designed for partitioning the data received from an external net via the first interface and instructions incoming from the protected computer via the second interface.

Such increase in the number of 'moderators' between individual computers (including those incorporated in the local net having a common control center) and an external net reduces the risk of unauthorized access to the protected data via Telnet, FTP or SNMP, but it does not exclude cracking DB and/or KB and/or damage of SW when utilizing new net protocols. Actually, the known arrangement does not provide for complete isolation of LTS and OS of the protected computer against attacks from the outside.

BRIEF DESCRIPTION OF INVENTION

The invention is based on the problem of creation—by enhancing the procedure of date exchange—such method and such device for protection against unauthorized access which could actually exclude logging of outside users in LTS and OS of the protected computers in the unrestricted interchange of any data via arbitrary communication links.

This problem is solved in that in a method for protection of computer memory against unauthorized access based on partitioning the data received via communication links open to general use and instructions for controlling the processing of data incoming from the protected computer, utilizing external hardware, according to the invention the method further includes:

a) in each communication session, logging all incoming messages first into at least one external storage (ES hereafter) locked at the side of the protected computer;

b) then locking the ES input at the side of the communication link;

c) sorting nonempty set of received messages under control of an external controller having native software independently of CPU, LTS and OS of the protected computer, arid extracting therefrom at least one nonempty subset of files that belongs to the group of subsets consisting of:

first subset of files having standard name extensions indicating a textual or iconic nature of those files, and/or second subset of files having standard name extensions indicating a program nature of those files, and/or third subset of files having non-standard name extensions that can be attributed either to the first or to the second of said subsets after additional analy sis; and d) processing messages in each of said subsets under control of said external controller again independently of CPU, LTS and OS of the protected computer in order to determine the demand in their reception and admissibility of their: inclusion in DB and/or KB and/or SW of the protected computer.

Inasmuch as such processing of all the received messages is carried out in the external sandbox based on ES having lockable inputs/outputs, it is possible to create substantially impenetrable firewall at the input to each protected computer or local computer net at low cost of software and hardware. Actually, at any number of sequential attacks from outside, any message comes to the protected computer only via the ES the contents of which are deleted after each communication session. Similarly, all the outputs to the external communication links take place via the ES with the interface of the protected computer being locked.

Therefore, any operation in the 'inquiry-answer' mode is substantially eliminated.

The first additional characteristic feature consists in that each received message being a textual and/or iconic file from said first subset is displayed via video display adapter only in the graphic mode in the shape of a pixel pattern, the demand in the received message is reviewed, and then:

in case of positive review, the pixel pattern is converted into the standard textual and/or graphic format in the active display window, and this converted message is logged directly from the active display window into the LTS of the protected computer, and the corresponding entry in the ES is deleted, and in case of negative review, the active display window is closed without storing any data, and the entry with the corresponding message in the ES is deleted.

The conversion of textual and/or iconic files into a pixel pattern and the reverse conversion of this pixel pattern into a suitable standard textual and/or graphic format at least deactivates and, in most cases, deletes any viruses and any worms or Trojan horses and similar 'complements' that hackers and crackers use for unauthorized access to the memories of other's computers.

The second additional characteristic feature consists in that said pixel pattern representing a textual and/or iconic file is formed with the usage of standard instructions for screen control. This allows sharp reduction in the consumption of hardware and software resources for said conversion and reverse conversion as well as reduction in the traffic on the transmission channel, for at least the background for the text and/or image is provided by one instruction. Similarly the usage of such instructions allows the texts and images comprising standard elements to be presented in more economical way.

The third additional characteristic feature consists in that said video display adapter and said display are a video display adapter and a display of the protected computer. This allows the external (relative to the protected computer) hardware of the firewall to be simplified without reducing the effectiveness of the protection against cracking.

The fourth additional characteristic feature consists in replacing the standard extension in the name of each program file of said second subset with a non-standard extension, executing a trial run of such file preferably externally of the protected computer, reviewing the demand in the received message, and then:

in case of positive review, storing a received program in the LTS of the protected computer, and deleting the entry with the initial message in the ES, and in case of negative review, deleting the entry with the wrong initial message in the ES.

Even when a suspicious program containing a worm and/or a Trojan horse is tested in a protected computer and adopted, said cracking means will be preserved in the storage of the protected computer for it can receive the next message from the outside only via lockable ES and it cannot automatically respond to the requests of the outside users.

The fifth additional characteristic feature consists in firstly displaying each received message of said third subset via the video display adapter in the graphic mode only, visually identifying as a file belonging to said first subset or to said second subset, and then:

a) reviewing the demand in each identified textual and/or iconic file by the visual analysis of the pixel pattern, and in case of positive review, converting the pixel pattern into a standard textual and/or graphic format in the active display window, and logging this converted message directly from the active display window into the LTS of the protected computer while deleting the corresponding entry in the ES, and in case of negative review, closing the active display window without storing any data, while deleting the entry with the corresponding message in the ES.

b) replacing the standard extension in the name of each identified program file with a non-standard extension, executing a trial run of the program preferably externally of the protected computer, reviewing the demand in the received program, and in case of positive review, storing the received program in the LTS of the protected computer, and deleting the entry with the initial message in the ES, and in case of negative review, deleting the entry with the wrong initial message in the ES.

Naturally, the textual and/or graphic files received under such processing will be substantially free of viruses or cracking programs, and the received program files will serve as burials for worms and/or Trojan horses.

The problem is also solved in that in the device for protection of the computer memory against unauthorized access, comprising an external (relative to the protected computer) means for data exchange between this computer and external sources of messages and at least one external controller for controlling the processing of messages received, designed for partitioning the data received from the external sources and instructions incoming from the protected computer, according to the invention:

the means for data exchange between the computer to be protected and external sources of messages is based on at least one external storage (ES) designed for logging each next set of incoming messages and temporarily storing it for the time of processing and which is connected to the external sources of messages via a controllable input switch, the external controller has its control output connected to said ES and is provided with native software loaded in a permanent storage (PS) for processing incoming messages, and the data output of said ES is connected to a framebuffer adapted for converting incoming textual and/or iconic messages into graphic format and sequentially outputting the converted messages via a controllable output switch to the display for testing and taking decision on receipt or refusal of each message.

Such device cuts off the OS and LTS of the protected computer against external sources of messages for the whole time of receiving and processing each next set of incoming messages. Then, it serves as a controllable buffer for sending only such messages from the protected computer to external communication links that are approved by the legal user in the mode when OS and LTS of the protected computer are disconnected from ES, and only the data output of this ES is connected with the communication link. Thus, even when receiving programs infected with worms and Trojan horses, no dialogue between the protected computer and any unauthorized user is ever possible.

The first additional characteristic feature consists in that, in the mode of testing the incoming messages, said framebuffer is connected to said display via native framebuffer of the protected computer. This reduces the hardware cost of the firewall.

The second additional characteristic feature consists in that said PS is connected between said controller and said ES. This allows not only the programs for processing the incoming messages to be incorporated in the firewall but also emulators of operation systems necessary for performing a substantial part of such processing inside the firewall.

The third additional characteristic feature consists in that the device for protection of computer memory is provided with an instruction buffer connected via input lock to at least one control output of the protected computer and then to the driving point of the controller and/or driving point of the ES. This allows, when necessary, compensation of damages or loss of the native SW of the firewall wholly or partially or modification of such SW and, as required by the user of the protected computer, manual control of the processing (i.e. testing and reviewing) of the incoming messages.

BRIEF DESCRIPTION OF THE DRAWING

The invention will now be explained by detailed description of a device and method for protection of the computer memory against unauthorized access with reference to the accompanying drawing wherein a block diagram of the device for protection of the computer memory against unauthorized access (DPCM hereafter) is represented.

BEST MODE FOR CARRYING OUT THE INVENTION

The DPCM comprises such external (relative to the protected computer) units:

a controllable input switch 1 for connection of DPCM to an arbitrary external communication link (not specially shown in the drawing) and disconnection such link for the time of processing a nonempty set of incoming messages, at least one external storage (ES) 2 having its data input connected to the switch 1 and adapted for logging and temporarily storing each next set of incoming messages for the time of processing thereof, an external controller 3 provided with native software for processing incoming messages and having its control output connected with ES 2, a permanent storage (PS) 4 connected between the controller 3 and ES 2 and adapted for storing said native SW, a framebuffer 5 connected to the data output of ES 2 and adapted for converting each incoming message into graphic format and, as required, for temporary storing converted messages till termination of testing and taking decision on receipt or refusal of each message, a controllable output switch 6 for connection of the framebuffer 5 to the data input of a display 7 of a protected computer 8, utilizing, as required, a video display adapter 9 intrinsic to the protected computer.

It is expedient that DPCM include an instruction buffer 10 connected via input lock 11 to at least one control output (e.g., of a keyboard and/or mouse) of the computer 8 and then to the driving point of the controller 3 and/or driving point of the ES. This same buffer 10 can be used for compensation of damages or loss and for modification of the native SW of the DPCM wholly or partially and, as required by the legal user of the computer 8, for manual control of the processing of the incoming messages.

All the mentioned units can be easily brought about by those skilled in the art of computer engineering on the basis of available components. Actually:

the external controller 3 can be instrumented on the basis of arbitrary modern processors for personal computers, and the ES 2 and PS 4 can be made in the form of usual "read only memory units (ROM)", nonvolatile memory units of the "EPROM" type, memory chips of the "FLASH" type, disks of the "CD ROM" type with corresponding laser drives, stand-alone drives provided with a hard disk and their optional suitable combinations.

The described device operates as means for executing a complex of programs for data exchange between the protected computer 8 and an arbitrary communication link.

Thus, the software for reception and processing of messages incoming via external communication link includes minimum the following components:

a) an instruction for automatically locking the controllable output switch 6 prior to connecting the computer 8 to the source of messages, e.g. Internet;

b) an instruction for automatically logging all incoming messages in each communication session in at least one ES 2 locked at the side of the computer 8;

c) an instruction for automatically locking the controllable input switch 1 at the data input of ES 2 after termination or interruption of the communication with the source of messages;

d) a program for preferably automatically sorting a nonempty set of received messages and extracting therefrom at least one nonempty subset of files that belongs to the group of subsets consisting of:

first subset of files having standard name extensions indicating a textual or iconic nature of those files, such as "txt; asc; rtf; doc; html; htm; bmp; jpg; gif, tif" et al. and/or second subset of files having standard name extensions indicating a program nature of those files, such as "exe; com; bat; log; sys; dat; dll; dot; chm; tlb; fon; pak; lsd; htf, ind; wdf; clf; swi" et al. and/or third subset of files having non-standard name extensions (usually assigned by the sender) that can be attributed to the first or to the second of said subsets only after additional analysis; and e) a program for processing messages in each of said subsets in order to determine the demand in their reception and admissibility of their inclusion in DB and/or KB and/or SW of the protected computer 8.

The sorting program always provides the operations of:

a) analysis of full names of received files;

b) comparison of actual extensions of file names with standard name extensions;

c) extraction of at least one said subset (considering that the files having any dubious extension can be included in the third subset).

Programs for processing messages are specific for each of said subsets of files and include mainly automatic and, as required and at request, manual operations.

Thus the program for processing messages in the form of textual and/or iconic files of said first subset provides as minimum:

a) automatically converting each message into the graphic format, i.e. into a pixel pattern;

b) automatically displaying said pixel pattern via video display adapter only in the graphic mode using, as required, standard commands for screen control (usage of the video display adapter 9 and display 7 as bypassing the OS and LTS of the protected computer 8 is absolutely safe);

c) reviewing the demand in the received message usually performed by a legal user of the protected computer 8 by way of visual analysis of the text and/or image in the active display window;

d) issuing (manually as a rule) an instruction either for receipt or refusal in receipt of the message;

e) usually automatically converting the pixel pattern that corresponds to the received message into a suitable standard textual and/or graphic format, and f) automatically or manually logging a received message in textual and/or iconic format directly from the active display window under a suitable name into the LTS of the protected computer 8 and automatically issuing an instruction for deleting the corresponding entry in the ES 2, or g) preferably automatically closing the active display window that contains a pixel pattern corresponding to the discarded message without storing any data and automatically issuing an instruction for deleting the corresponding entry in the ES 2;

h) automatically deleting the accepted or discarded message in the ES 2 after the operation (f) or (g) performed depending on the pre-setting, either immediately or after an optional time delay (till the termination of the processing of all messages logged in the ES 2 in one communication session).

The program for processing messages in the form of program files of said second subset provides as minimum:

a) usually automatically replacing a standard name extension of each received program file with a non-standard extension;

b) preferably manually executing a trial run of the program file with a modified name preferably externally of the protected computer 8 (particularly in the DPCM, with the help of the controller 3 and PS 4);

c) reviewing the demand in the received message usually performed by a legal user of the protected computer 8 by way of analyzing the results of said trial run;

d) issuing (manually as a rule) an instruction either for receipt or refusal in receipt of the program message;

e) preferably manually logging a received program (preferably with a new name) into the LTS of the protected computer 8 and automatically issuing an instruction for deleting the corresponding entry in the ES 2, or f) automatically issuing an instruction for deleting the entry with the discarded program message in the ES 2; and g) automatically deleting the accepted or discarded message in the ES 2 after the operation (e) or (f) performed depending on the pre-setting, either immediately or after an optional time delay (till the termination of the processing of all messages logged in the ES 2 in one communication session).

The program for processing messages in the form of undefined files of said third subset provides as minimum:

a) automatically converting each undefined message into the graphic format, i.e. into a pixel pattern;

b) automatically displaying said pixel pattern via video display adapter only in the graphic mode using, as required, standard commands for screen control (usage of the video display adapter 9 and display 7 as bypassing the OS and LTS of the protected computer 8 is absolutely safe);

c) identifying each next message either as a file belonging to said first subset or as a file belonging to said second subset, and then:

either performing operations (c) to (h) of the described above program for processing textual and/or iconic files for each detected file of such type, or performing all operations of the described above program for processing each detected program file.

A significant part of the firewall of the invention is a program for transferring messages from the protected computer 8 into the external communication link. It comprises:

a) a manually issued instruction for connecting the protected computer 8 to the external communication link that causes locking both switches 1 and 6;

b) instructions issued via input lock 11 and buffer 10 for automatically checking the absence of entries in ES 2 after preceding communication session and automatic reset of ES 2 in case any wrong entries were left for some reasons;

c) a usually manually issued instruction for logging messages intended to be sent that enter the ES 2 via input lock 11 and buffer 10;

d) an instruction for automatically unlocking the switch 1 performed after termination of the logging in the ES 2;

e) an instruction for sending messages into the external communication link which is usually performed automatically while the switch 6 and the lock 11 are blocked.

INDUSTRIAL APPLICABILITY

The invention is industrially applicable for:

the device for protection of computer memory against unauthorized access can be easily instrumented on the basis of available components, the method carried out by means of this device provides for substantially impenetrable protection of data bases and/or knowledge bases and/or software of computers protected against cracking.

What is claimed is:

1. A system for protecting a computer device from unauthorized access, said protecting system being configured for receiving data addressed to said protected computer device, said protecting system comprising:

a controller for processing the data supplied from a data source for delivery to the protected computer device having a computer memory for storing software, the data source and the protected computer device being external with respect to the protecting system, the controller producing graphic information representing said data, the graphic information being produced in a graphic format inside said protecting system, and an output buffer providing a path for transferring the graphic information to a monitor for presenting to a user of the protected computer device the data addressed to the protected computer device.

2. The system of claim 1, wherein said graphic information is formed of a pixel pattern displayable by a monitor controllable by said computer device.

3. The system of claim 1, wherein said source of data is configured for supplying said data via a communication link.

4. The system of claim 1, wherein said controller is configured for receiving instructions from an input device of said computer device.

5. The system of claim 4, further comprising an input buffer connected to the input device, and responsive to the instructions from the input device for supplying the controller with a driving signal.

6. The system of claim 4, wherein the input buffer is arranged separately from the output buffer.

7. The system of claim 1, wherein said output buffer is configured for temporarily storing converted graphic information until processing of said data is completed.

8. The system of claim 1, further comprising a storage for storing said data during a period of processing said data by said controller.

9. The system of claim 1, wherein the controller is configured for replacing a name extension of a program file received from the source of data with another name extension.

10. The system of claim 1, further comprising a controllable input switch connectable to said source of data and configured for preventing said data from being supplied to the controller after termination of communication with said source of data.

11. The system of claim 1, further comprising a controllable output switch configured for outputting said graphic information.

12. A method of preventing unauthorized access to a computer device using a protection device, the method comprising the steps of:

preventing by the protection device external with respect to the computer device having a computer memory for storing software, data addressed to the computer device from being supplied to the computer device, supplying said data to the protection device, and processing said supplied data to produce, inside the protection device, graphic information in a graphic format for supplying to a monitor, the graphic information representing the data addressed to the computer device.

13. The method of claim 12, further comprising the step of displaying said graphic information formed of a pixel pattern, by a monitor controllable by the computer device.

14. The method of claim 12, further comprising the step of supplying instructions from an input device of said computer device to said protection device.

15. The method of claim 14, wherein the instructions from the input device to the protection device are transferred via a path provided by an input buffer separate from an output buffer that provides a path for transferring the graphic information from the protection device to the monitor.

16. The method of claim 15, further comprising the step of temporarily storing converted graphic information until processing of the supplied data is completed.

17. The method of claim 12, further comprising the step of storing said supplied data in a storage device during processing of said supplied data.

18. The method of claim 12, further comprising the step of preventing said supplied data from being supplied to the protection device after termination of communication with a source of said supplied data.

19. The method of claim 12, further comprising the step of providing controllable output of said graphic information.

20. The method of claim 12, further comprising the step of preventing data stored in the computer device from being transferred outside of the computer device.

* * * * *